US008145600B1

(12) United States Patent
Lewis et al.

(10) Patent No.: US 8,145,600 B1
(45) Date of Patent: Mar. 27, 2012

(54) VERSION PREVIEW AND SELECTION

(75) Inventors: Lance Lewis, San Ramon, CA (US); Ashish Duggal, Delhi (IN); Nathan Marroquin, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 419 days.

(21) Appl. No.: 11/982,536

(22) Filed: Nov. 2, 2007

(51) Int. Cl.
*G06F 7/00* (2006.01)
*G06F 17/00* (2006.01)

(52) U.S. Cl. ......... 707/638; 707/695; 715/209; 717/170

(58) Field of Classification Search .................. 707/200, 707/202, 638, 695, 999.203; 715/209; 717/170
See application file for complete search history.

(56) References Cited

U.S. PATENT DOCUMENTS

| | | | |
|---|---|---|---|
| 5,659,676 A | 8/1997 | Redpath | |
| 5,805,889 A * | 9/1998 | Van De Vanter | 717/107 |
| 5,950,215 A * | 9/1999 | Tabuchi | 715/200 |
| 6,088,693 A * | 7/2000 | Van Huben et al. | 707/8 |
| 6,094,657 A | 7/2000 | Hailpern et al. | |
| 7,072,893 B1 * | 7/2006 | Rehfeld et al. | 707/8 |
| 7,092,969 B2 * | 8/2006 | Meek et al. | 707/104.1 |
| 7,092,974 B2 * | 8/2006 | Thomas et al. | 707/999.203 |
| 7,603,357 B1 * | 10/2009 | Gourdol et al. | 707/10 |
| 2004/0255247 A1 * | 12/2004 | Demsky et al. | 715/530 |
| 2004/0268249 A1 | 12/2004 | Fennelly et al. | |
| 2005/0125462 A1 * | 6/2005 | Lara et al. | 707/203 |
| 2005/0253848 A1 * | 11/2005 | Bugaj et al. | 345/473 |
| 2006/0026376 A1 * | 2/2006 | LaChapelle et al. | 711/170 |
| 2006/0112017 A1 | 5/2006 | Koppich | |
| 2006/0150151 A1 | 7/2006 | Dubinsky | |
| 2006/0179080 A1 * | 8/2006 | Meek et al. | 707/200 |
| 2006/0262339 A1 | 11/2006 | Jacobs et al. | |
| 2006/0294159 A1 * | 12/2006 | Dettinger et al. | 707/203 |
| 2007/0244935 A1 * | 10/2007 | Cherkasov | 707/203 |
| 2008/0005138 A1 * | 1/2008 | Gauthier et al. | 707/101 |
| 2008/0069473 A1 * | 3/2008 | Tojo | 382/276 |

* cited by examiner

*Primary Examiner* — Phong Nguyen (74) *Attorney, Agent, or Firm* — Robert C. Kowert; Meyertons, Hood, Kivlin, Kowert & Goetzel, P.C.

(57) ABSTRACT

Techniques for version preview and selection are described, including detecting a plurality of versions of an asset in a compound document, receiving an input indicating selection of a version, wherein the version is one of the plurality of versions, and updating the compound document with the version.

12 Claims, 7 Drawing Sheets

VERSION PREVIEW AND SELECTION

FIELD OF THE INVENTION

The present invention relates generally to software and compound documents. More specifically, techniques for version preview and selection are described.

BACKGROUND

A compound document is a document that includes assets, such as images, spreadsheets, digital videos, digital audio, and other multimedia features. Using conventional techniques, a compound document is typically produced using word processing software or page layout software, intermingling regular text with assets (e.g., images, spreadsheets, digital videos, digital audio, and other multimedia features). Assets in compound documents typically have different versions. Conventionally, different versions of an asset in a compound document are managed by deleting and replacing undesirable versions with desired versions. Conventional techniques such as a version control system are used to track multiple revisions of an asset. Changes to the asset are identified by incrementing an associated number or letter code. For example, the initial version of an asset is assigned version number "1" and when the first change is made to the asset, the version number is incremented to "2," and so on. With some conventional techniques, a user can choose to update a given asset to the latest version of the asset. For example, if a compound document has version "2" of an asset and the latest version of the asset is version "5," some conventional software allows the user to update the asset to version "5," but the user can not preview or choose version "1," version "3," or version "4," using conventional techniques. Users are unable to navigate between versions of an asset without incurring manually-intensive efforts to add, delete, and replace assets (e.g., images, photos, spreadsheets, or the like). For example, if a user wants to view different versions of an asset within the document, the user must manually add one version, view the version within the document, delete the version, and continue the process for each version the user wishes to view. This is both time-consuming and labor-intensive. Further, conventional software does not allow users to freeze a compound document in time, setting the current versions of the assets for the compound document and preventing unwanted updates to the compound document.

Thus, a solution for previewing and selecting versions of an asset in a compound document without the limitations of conventional techniques is needed.

BRIEF DESCRIPTION OF THE DRAWINGS

Various examples are disclosed in the following detailed description and the accompanying drawings.

DETAILED DESCRIPTION

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

In some examples, the described techniques may be implemented as an application or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, AIR™, Flex™, Java™, Javascript™, Ajax, COBOL, Fortran, ADA, XML, HTML, DHTML, XHTML, HTTP, XMPP, and others. Design, publishing, and other types of applications such as Dreamweaver®, Shockwave®, Fireworks®, and InDesign® may also be used to implement the described techniques. The described techniques may be varied and are not limited to the examples or descriptions provided.

Techniques for previewing and selecting versions of an asset in a compound document are described. Computer programs, software, or applications ("applications") used to create or modify text, visual, graphic, audio, video, or other types of content, presentations, and graphical user interfaces (GUIs) may be used to provide a displayed environment where users may preview and select versions of an asset in a compound document. As used herein, the term "compound document" refers, at least in one example, to a document that includes assets, such as images, spreadsheets, digital videos, digital audio, and other multimedia features. In some examples, an asset in a compound document may have multiple versions. When multiple versions of an asset are available for association with a compound document, a graphical user interface may be configured display options for previewing or selecting a version associated with the compound document. A user may select any version from multiple versions of an asset that are available, regardless of the current version selected. For example, if five versions of an asset are available, and the current version selected is version "3," the user may change the selected version to version "1," version "2," version "4," or version "5." Further, the selection of a version occurs in the displayed environment of the compound document; the user may preview and select any version without exiting the environment of the compound document. In some examples, users may select a version by browsing through each of the versions available using a graphical user interface associated with the compound document. In other examples, users may select a version by entering the version number in a field association with a graphical user interface associated with the compound document. As used herein, "version number" refers, in at least one example, to an associated number or letter code that is incremented to identify changes to an asset. In still other examples, users may select a version by selecting the version from a menu presented in a graphical user interface. Once a version is selected, the compound document is updated with the version. Thus, the selected version becomes the version of the asset associated with the compound document. Further, users may freeze the selected version of an asset by pinning the version to the compound document. As used herein, "pinning" refers, at least in one example, to associating the selected version of an asset to the compound document permanently, until it is un-pinned. Pinning an asset to a compound document allows users to freeze a selected version of the asset in time, setting the current version of the asset for the compound document and preventing unwanted updates to the compound document. As used herein, "un-pinning" refers, at least in one example, to disassociating the selected version of an asset from the compound document, allowing users to freely select or preview other versions of the asset.

Figure 1:
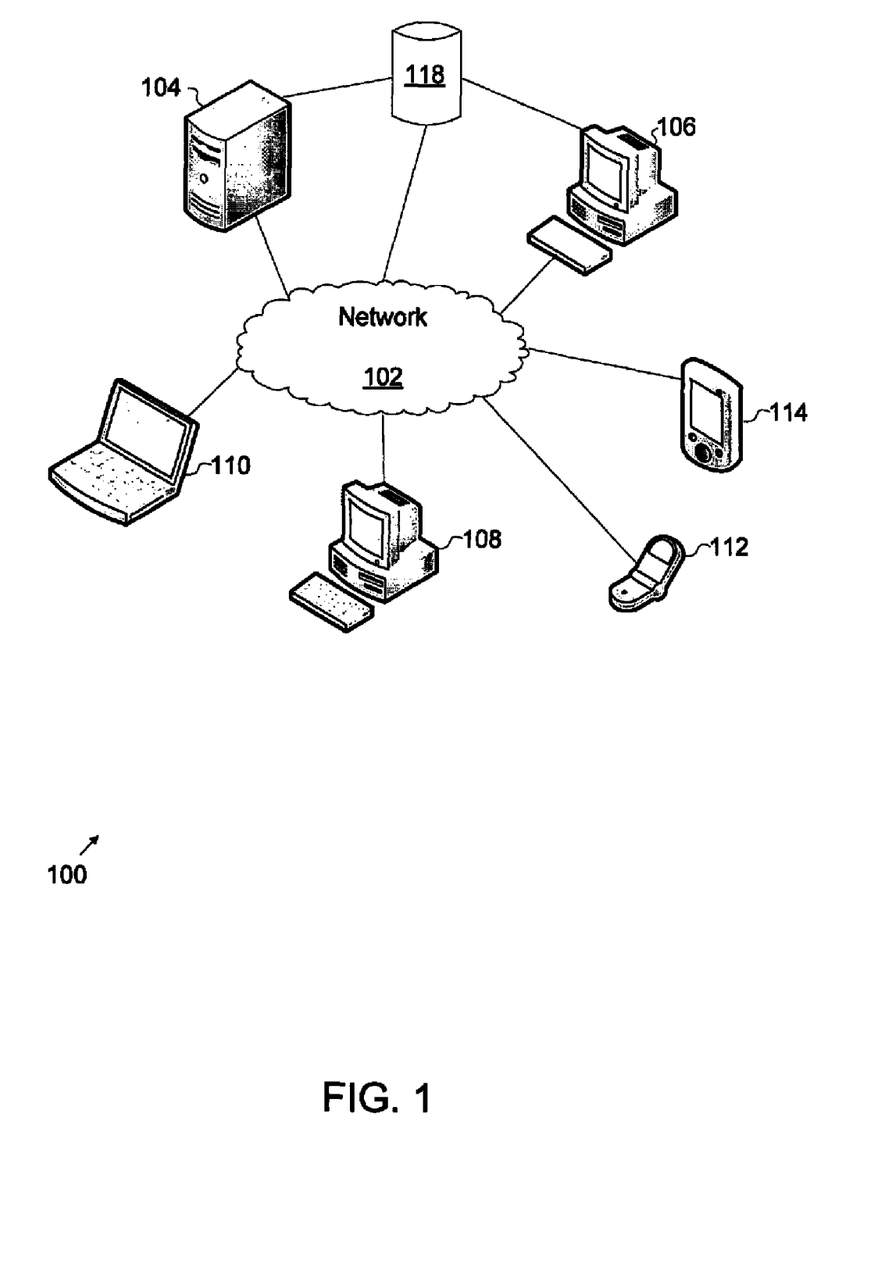
FIG. 1 illustrates an exemplary system for version preview and selection.

FIG. 1 illustrates an exemplary system for version preview and selection. Here, system 100 includes network 102, server 104, clients 106-114, and database 118. System 100 may be used to implement the described techniques for previewing and selecting versions of an asset in a compound document. In some examples, network 102 may be implemented using the Internet, a local area network (LAN), wide area network (WAN), municipal area network (MAN), wireless local area network (WLAN), or any other type or topology of network apart from those described herein. Further, direct and indirect connections and couplings may be provided between clients 106-114 across network 102, which may also be implemented using one or more networks. As an example, clients 106-114 may be implemented using a desktop or laptop computer, mobile computing device, personal digital assistant (PDA), smart phone, camera phone, or any other type of computing device. System 100 is not limited to any particular type of client and various types other than those described above may be used. Further, network connections or couplings between the above-described elements in system 100 may be varied and are also not limited to the examples provided.

In other examples, server 104 may be implemented and used to deliver (i.e., serve) content, information, or data requested by one or more of clients 106-114. For example, content requested by client 106 may be performed using a web browsing application (not shown) installed on client 106. Content may include text, documents, files, images, photos, applications, or any type of information or data. When requested from server 104, content may be delivered to the requesting client (i.e., clients 106-114). In other examples, server 104 may be a server configured for a given purpose (e.g., ad server, web server, content server, application server, web services, gateway, and others). In yet other examples, server 104 may be a server network configured for a given purpose (e.g., ad server, web server, content server, application server, web services, gateway, and others). Techniques for previewing and selecting versions of an asset in a compound document such as those described herein may be implemented using the above-described system and topology. In some examples, previewing and selecting versions of an asset in a compound document may be performed locally on one or more of clients 106-114. In other examples, previewing and selecting versions of an asset in a compound document may be performed remotely or in a distributed manner using server 104 and one or more of clients 106-114. Further, other system configurations, topologies, clients, end devices, and intermediate devices, and implementation techniques may be used and are not limited to those described above.

Figure 2:
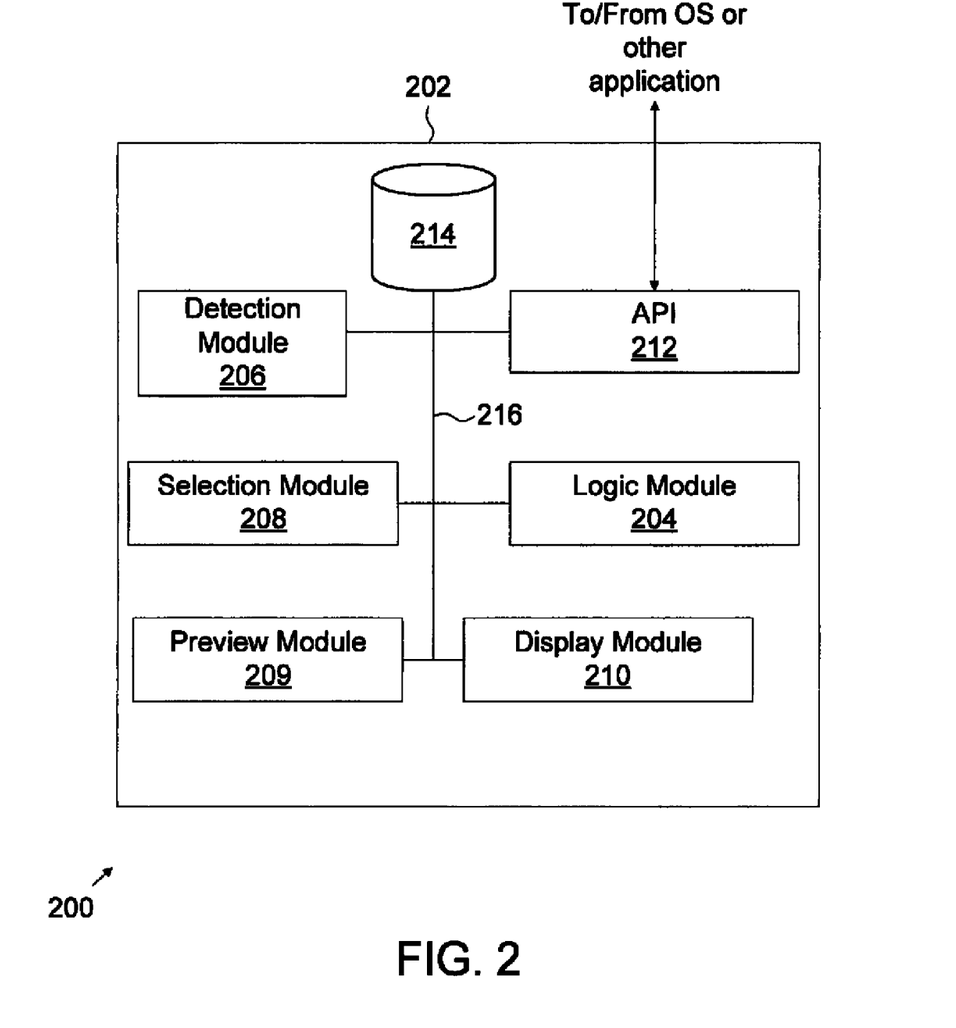
FIG. 2 illustrates an exemplary application for version preview and selection.

FIG. 2 illustrates an exemplary application for version preview and selection. Here, system 200 includes application 202, logic module 204, detection module 206, selection module 208, preview module 209, display module 210, application programming interface (API) 212, repository 214, and data bus 216. Logic module 204, detection module 206, selection module 208, preview module 209, display module 210, API 212, and storage 214 may be configured to transfer data between each of the above-described elements using data bus 216. In some examples, storage 214 may be a local storage repository or memory implemented on a device running application 202. In other examples, storage 214 may be implemented as part of application 202 (as shown) or as a separate element included on the same device as application 202. In yet other examples, storage 214 may be a remote repository, which may be networked directly or indirectly to application 202. Data may be stored in either storage 214 or a remote repository (not shown), and data may be organized into files. Files may include data associated with documents, images, text, applications, video, audio, applications, program or software code, photos, or any other type of data that may be grouped together as a stream of bits (e.g., "1," "0," or any other data representation using binary, tertiary, or any other type of number system using a different mathematical base) that may be opened, accessed, launched, executed, run, downloaded, or otherwise operated upon as a single unit or instantiation. Further, files may include content such as text, images, spreadsheets, digital videos, digital audios, advertisements, web sites and pages, documents, articles, web services-delivered content and applications, or other content formatted in various types of formats using different applications. In some examples, files, when retrieved from repository 214, may be opened and launched based on the type of file retrieved. For example, a video file may be downloaded, retrieved, streamed, or otherwise accessed from repository 214. As another example, a web site having video and audio data may be streamed as a data stream from repository 214. Further, application 202 may be implemented as part of another application or as a separate application in data communication with other applications (e.g., operating systems, applications, and others) using API 212.

Detection module 206 may be configured to detect multiple versions of an asset in a compound document. In some examples, detection module 206 may detect one version of an asset in a compound document. In other examples, detection module 206 may detect more than one version of an asset in a compound document. When more than one version of an asset in a compound document is detected, selection module 208 may be configured to indicate selection of a version, where the version may be selected from any version of the asset. Display module 210 may be configured to provide a graphical user interface for selection of a version. In some examples, a graphical user interface may have scroll arrows (i.e., icons that provide directional suggestions for navigating between versions) and a user may preview and select previous and later versions of an asset by pressing the left scroll arrow or the right scroll arrow, respectively. In other examples, a graphical user interface may have a field for entering a version number. In still other examples, a graphical user interface may include a menu that presents the versions for selection. A transaction flow initiated by an interaction to select a version may be communicated using API 212 from another application or operating system (OS). Logic module 204 may be implemented to provide logic, control, coordination, command, signaling, and other functions and features for application 202. For example, logic module 204 may be configured to show each selected version of an asset in the compound document while a user browses through each of the versions. In other examples, preview module 209 may be configured to preview each selected version of an asset in the compound document.

In some examples, a transaction flow initiated by an interaction to pin a version of an asset may be communicated using API 212 from another application or OS. Logic module 204 may be configured to pin an asset to a compound document and logic module 204 may be configured to un-pin an asset from a compound document. In other examples, system 200 and the described elements may be varied in implementation, function, or structure and are not limited to the examples provided.

Figure 3A:
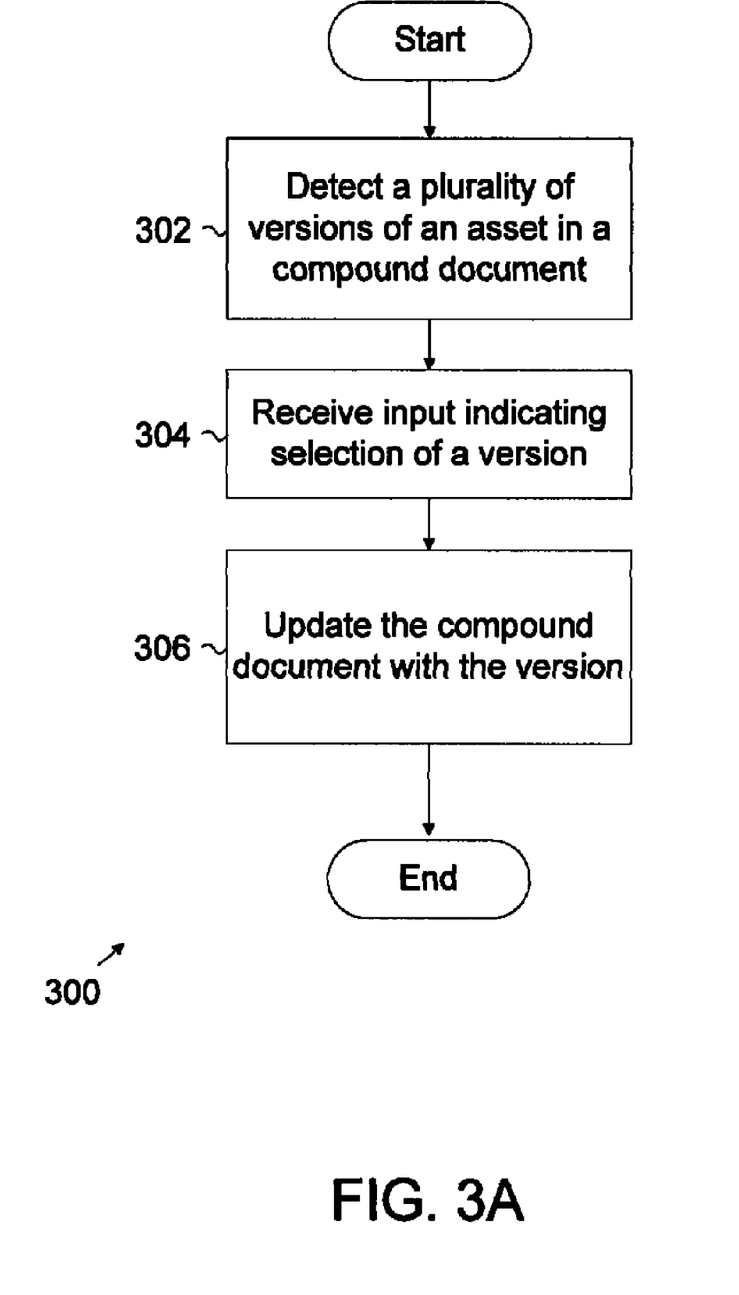
FIG. 3A illustrates an exemplary process for version preview and selection.

FIG. 3A illustrates an exemplary process for version preview and selection. Here, process 300 starts by detecting a plurality of versions of an asset in a compound document (302). Once one or more versions of an asset are detected, an input is received indicating selection of a version (304). In some examples, receiving an input indicating selection of the version occurs by evaluating an input (e.g., signal, data, or the like) generated when browsing through each of the plurality of versions using a graphical user interface associated with the compound document. For example, the graphical user interface may have scroll arrows (i.e., icons that provide directional suggestions for navigating between versions (e.g., previous, next, or the like)) and a user may preview and select previous and later versions of an asset by pressing the left scroll arrow or the right scroll arrow, respectively. In other examples, receiving an input indicating selection of the version occurs by entering a version number into a field associated with a graphical user interface associated with the compound document. Process 300 continues by updating the compound document with the version (306). In some examples, by updating the compound document, the selected version becomes the version of the asset associated with the compound document. In other examples, the above-described process may be varied and is not limited to the processes or sub-processes described above.

Figure 3B:
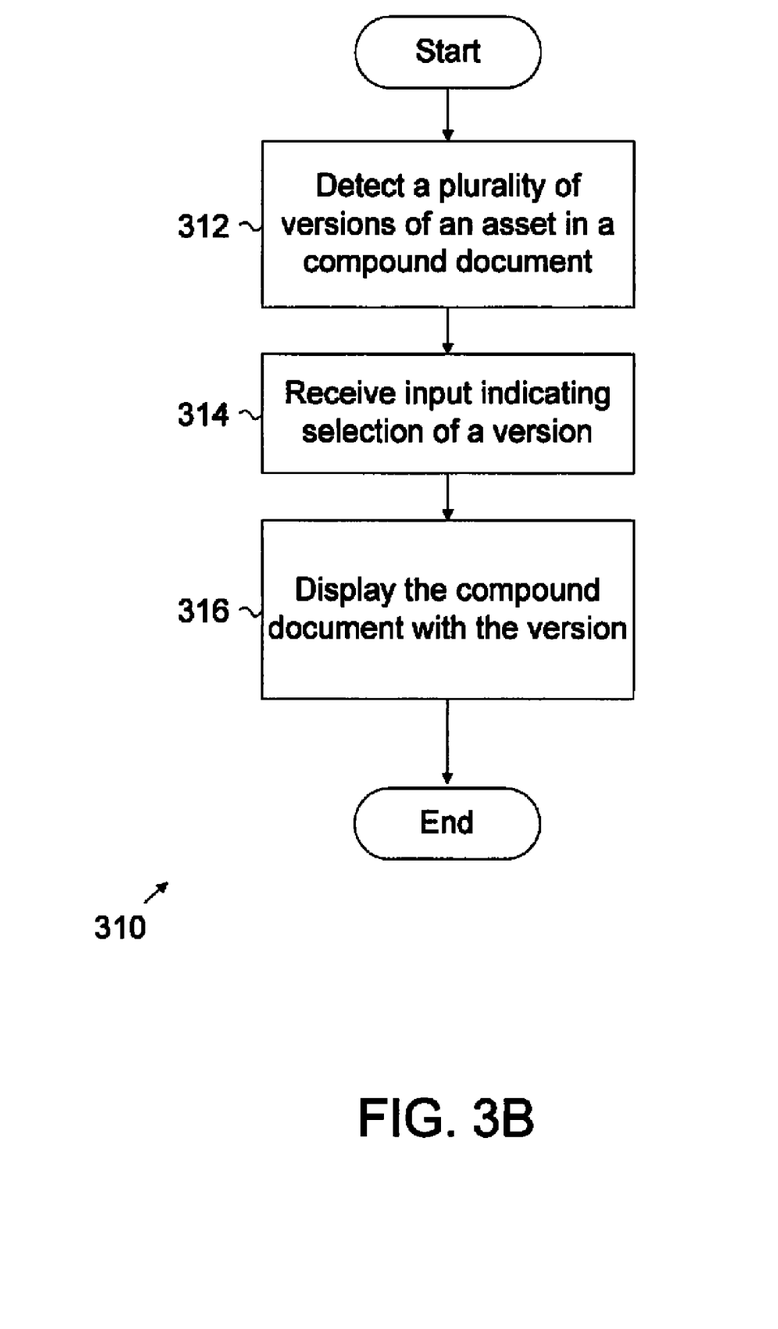
FIG. 3B illustrates an alternative exemplary process for version preview and selection.

FIG. 3B illustrates an alternative exemplary process for version preview and selection. Here, process 300 starts by detecting one or more versions of an asset in a compound document (312). Once one or more versions of an asset are detected, an input indicating selection of a version may be received (314), where the input being provided uses a graphical user interface, and the version is among the one or more versions. In some examples, an input indicating selection of a given version may be received when one or more versions is previewed using a graphical user interface associated with the compound document. For example, a graphical user interface may have scroll arrows (i.e., icons that provide directional suggestions for navigating between versions (e.g., previous, next, or the like)) and a user may preview and select previous and later versions of an asset by pressing the left scroll arrow or the right scroll arrow, respectively. In other examples, an input indicating selection of the version may be received when a version number is entered into a field associated with a graphical user interface associated with the compound document. In still other examples, an input indicating selection of the version may be received when the version is selected from a menu presented in a graphical user interface. Process 300 continues by displaying the compound document with the version (316). In some examples, displaying the compound document with the version includes the version being displayed in association with the compound document. Thus, when the compound document is later opened or accessed, the version selected is the version of the asset displayed and associated with the compound document. In other examples, the above-described process may be varied and is not limited to the processes or sub-processes described above.

Figure 4:
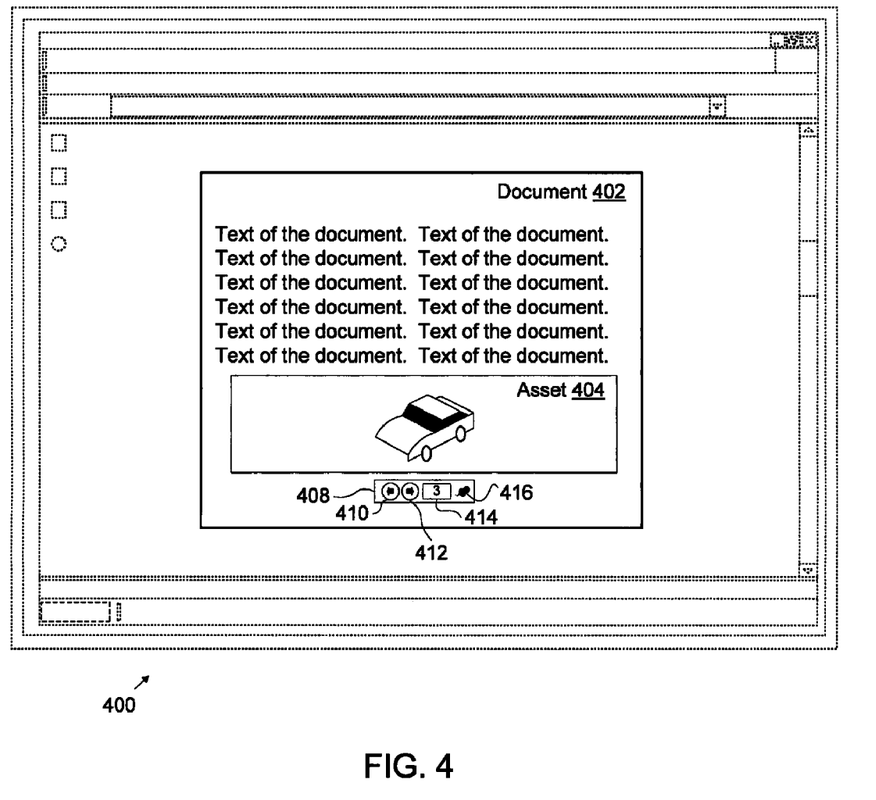
FIG. 4 illustrates an exemplary user interface for version preview and selection.

FIG. 4 illustrates an exemplary user interface for version preview and selection. Here, system 400 includes document 402, asset 404, graphical user interface (GUI) 408, scroll buttons 410-412, field 414, and pin 416. Although in FIG. 4, one asset and one corresponding GUI is shown in document 402, in other examples, the number of assets and corresponding GUIs may be varied. Although system 400 shows one example of an application with document 402, document 402 may be implemented differently using other types of applications and the examples described are not limited to any particular software environment as application 202 (FIG. 2) may be implemented using various types of software.

FIG. 4 illustrates version "3" of asset 404 selected in document 402. In this example, GUI 408 is configured to indicate selection of a version. Field 414 displays the version number currently shown and selected for document 402. Assume in this example that asset 404 has five versions. Here, scroll button 410 may be pressed to browse through previous versions of asset 404. For example, to preview and select version "2," scroll button 410 may be pressed once. As another example, to preview and select version "1," scroll button 410 may be pressed twice. Similarly, scroll button 412 may be pressed to browse through subsequent versions of asset 404. For example, to preview and select version "4," scroll button 412 may be pressed once. As another example, to preview and select version "5," scroll button 412 may be pressed twice. Using scroll buttons 410-412, users may quickly preview and select various versions of an asset without exiting the environment of document 402. Once a version is selected, document 402 is updated with the version. Thus, the selected version becomes the version of the asset associated with the document 402. For example, to preview and select version "4," scroll button 412 may be pressed once. Then document 402 is displayed with version "4" of asset 404 and version "4" of asset 404 is associated with document 402.

Further, users may freeze the selected version of an asset by pinning the version to document 402. Pin 416 may be used to pin a selected version to document 402. For example, here, version "3" of asset 404 has been selected. A user may press pin 416 to associate version "3" of asset 404 to document 402 permanently, until it is un-pinned from document 402. Pinning version "3" of asset 404 to document 402 allows a user to set asset 404 to be version "3," regardless of any updates or newer versions of asset 404. Using pin 416 to set a selected version prevents unwanted updates to document 402. In some examples, there may be a graphical representation that a version has been pinned to document 402 (not shown). Once a version of asset 404 has been pinned to document 402, scroll buttons 410-412 and field 414 may not change the version of asset 404. After a version has been pinned to document 402, it may be un-pinned by pressing pin 416 again. In this example, pin 416 is a toggle switch, used to pin or un-pin versions of asset 404 accordingly. In other examples, pin 416 may be implemented as two separate buttons for pinning or un-pinning. In still other examples, the pin 416 may be implemented, designed, and function differently. In yet other examples, system 400 and the above-described elements may be varied and are not limited to the functions, structures, configurations, or implementations provided.

Figure 5:
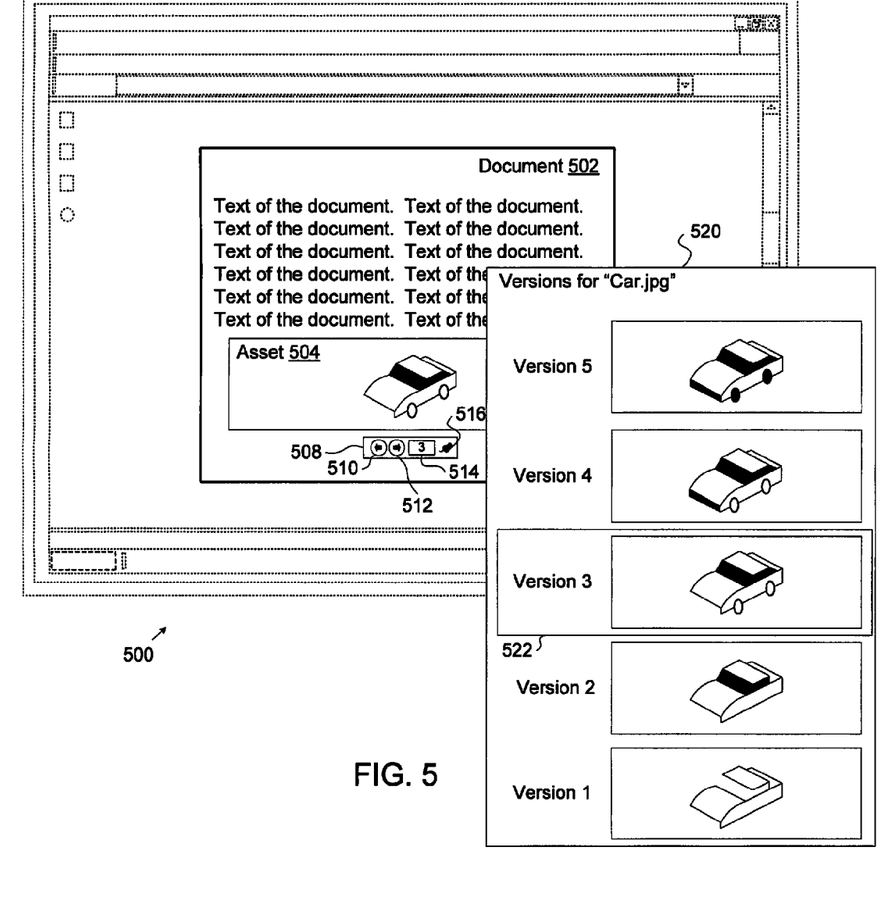
FIG. 5 illustrates an alternative exemplary user interface for version preview and selection.

FIG. 5 illustrates an alternative exemplary user interface for version preview and selection. Here, system 500 includes document 502, asset 504, graphical user interface (GUI) 508, scroll buttons 510-512, field 514, pin 516, menu 520, and selection box 522. Although in FIG. 5, one asset and one corresponding GUI is shown in document 502, in other examples, the number of assets and corresponding GUIs may be varied. Although system 500 shows one example of an application with document 502, document 502 may be implemented differently using other types of applications and the examples described are not limited to any particular software environment as application 202 (FIG. 2) may be implemented using various types of software.

GUI 508, scroll buttons 510-512, field 514, and pin 516 may be implemented as described above in conjunction with GUI 408, scroll buttons 410-412, field 414, and pin 416 of FIG. 4. Menu 520 illustrates an alternative graphical user interface for selection of a version. Although slight variations of asset 504 are shown in FIG. 5, in other examples, versions of asset 504 may have more variation. In some examples, menu 520 may be displayed after right-clicking on asset 504. In other examples, menu 520 may be displayed after selecting a toolbar option in the application. After menu 520 is displayed, selection box 522 may be used to select a version. Once a version is selected, the compound document may be updated with the version, and the selected version becomes the version of the asset associated with the compound document. Thus, when the compound document is later opened or accessed, the version selected is the version of the asset displayed and associated with the compound document. Further, the selection of a version occurs in the displayed environment of the compound document; the user may preview and select any version of the asset without exiting the environment of the compound document. In other examples, system 500 and the above-described elements may be varied and are not limited to the functions, structures, configurations, or implementations provided.

Figure 6:
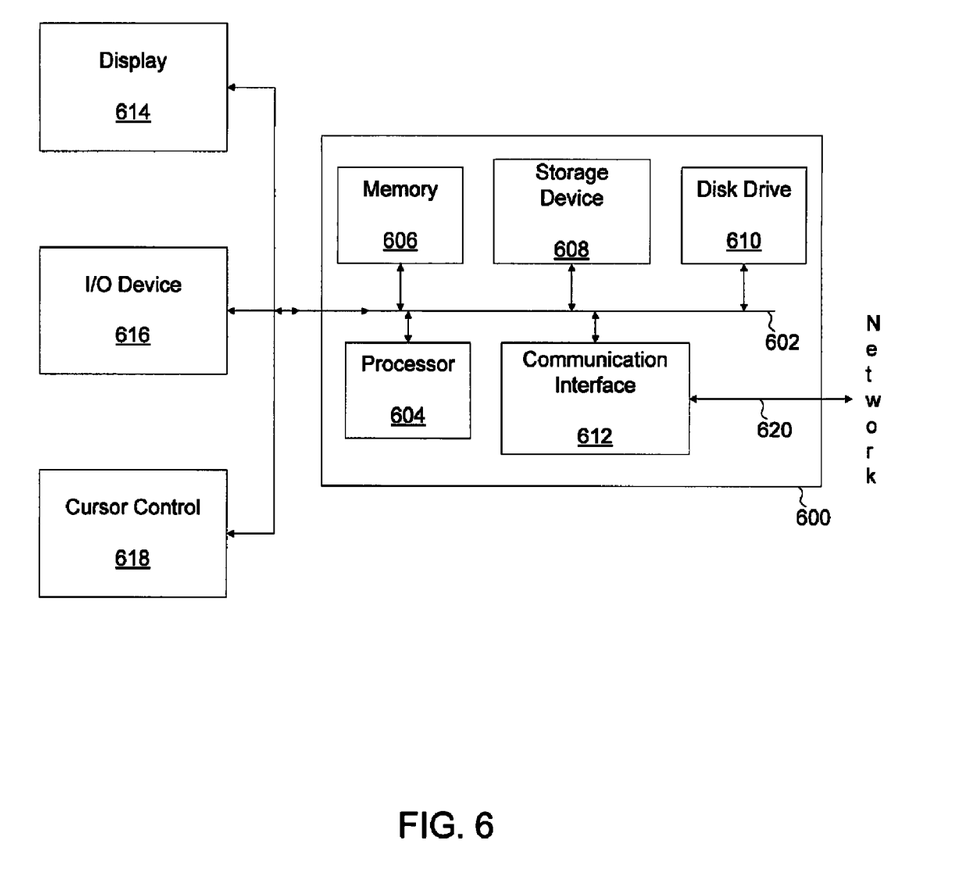
FIG. 6 illustrates an exemplary computer system suitable for version preview and selection.

FIG. 6 illustrates an exemplary computer system suitable for version preview and selection. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball).

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, hard-wired circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed is:

1. A method, comprising:
  performing by a computing device:
    displaying a document by the computing device, wherein the document comprises a versioned asset and other content, and wherein the versioned asset comprises a plurality of versions, wherein said displaying comprises:
      displaying the document in a window, wherein the display of the document comprises a display of one of the plurality of versions of the asset and a display of at least a portion of the other content; and
      displaying, in the same window, a version selector for the asset, wherein the version selector is configured to receive input to navigate to a next or previous one of the plurality of versions of the asset without listing the versions of the asset;
    receiving, via the version selector, user input which indicates selection of the next or previous one of the plurality of versions of the asset; and
    in response to the selection of the next or previous version of the asset, updating the display of the asset, within the same document, to display the selected next or previous version of the asset, wherein the display of the asset is updated independently of the displayed portion of the other content.

2. The method of claim 1, wherein receiving user input which indicates selection of the next or previous version of the asset further comprises translating an input associated with selection of the next or previous version, the input being received using a graphical user interface associated with the document.

3. The method of claim 1, wherein receiving user input which indicates selection of the next or previous version of the asset comprises evaluating an input entered into a field, the input indicating the next or previous version of the asset.

4. The method of claim 1, further comprising pinning the next or previous version of the asset to the document.

5. The method of claim 1, further comprising un-pinning the next or previous version of the asset from the document.

6. A method, comprising:
performing by a computing device:
displaying a document by the computing device, wherein the document comprises a versioned asset and other content, and wherein the versioned asset comprises a plurality of versions, wherein said displaying comprises:
displaying the document in a window, wherein the display of the document comprises a display of one of the plurality of versions of the asset and a display of at least a portion of the other content; and
displaying, in the same window, a version selector for the asset, wherein the version selected is configured to receive input to navigate to a next or previous one of the plurality of versions of the asset without listing the versions of the asset;
receiving, via the version selector, user input which indicates selection of the next or previous one of the plurality of versions of the asset, wherein the input is received via a graphical user interface within the display of the same document; and
in response to the selection of the next or previous version of the asset, updating the display of the asset, within the same document, to display the selected next or previous version of the asset, wherein the display of the asset is updated independently of the displayed portion of the other content.

7. The method of claim 6, further comprising pinning the next or previous version of the asset to the document.

8. A system, comprising:
a memory configured to store data associated with a document; and
a processor coupled to the memory, wherein the memory comprises program instructions executable by the processor to:
display the document by the system, wherein the document comprises a versioned asset and other content, and wherein the versioned asset comprises a plurality of versions, wherein said displaying comprises:
display the document in a window, wherein the display of the document comprises a display of one of the plurality of versions of the asset and a display of at least a portion of the other content; and
display, in the same window, a version selector for the asset, wherein the version selector is configured to receive input to navigate to a next or previous one of the plurality of versions of the asset without listing the versions of the asset;
receive, via the version selector, user input which indicates selection of the next or previous one of the plurality of versions of the asset; and
in response to the selection of the next or previous version of the asset, update the display of the asset, within the same document, to display the selected next or previous version of the asset, wherein the display of the asset is updated independently of the displayed portion of the other content.

9. The system of claim 8, wherein the user input which indicates selection of the next or previous version of the asset is received via a graphical user interface within the display of the same document.

10. The system of claim 8, further comprising pinning the next or previous version of the asset to the document.

11. The system of claim 8, further comprising un-pinning the next or previous version of the asset from the document.

12. A computer program product embodied in a computer non-transitory storage medium and comprising computer instructions that when executed:
display a document by a computing device, wherein the document comprises a versioned asset and other content, and wherein the versioned asset comprises a plurality of versions, wherein said displaying comprises:
display the document in a window, wherein the display of the document comprises a display of one of the plurality of versions of the asset and a display of at least a portion of the other content; and
display, in the same window, a version selector for the asset, wherein the version selector is configured to receive input to navigate to a next or previous one of the plurality of versions of the asset without listing the versions of the asset;
receive, via the version selector, user input which indicates selection of the next or previous one of the plurality of versions of the asset; and
in response to the selection of the next or previous version of the asset, update the display of the asset, within the same document, to display the selected next or previous version of the asset, wherein the display of the asset is updated independently of the displayed portion of the other content.

* * * * *